Oct. 23, 1962 J. E. LISINSKI 3,059,753

DOCUMENT HANDLING SYSTEM

Filed Aug. 25, 1960

INVENTOR.
J. E. LISINSKI

BY Elmer Galbiati

AGENT

United States Patent Office 3,059,753

Patented Oct. 23, 1962

3,059,753

DOCUMENT HANDLING SYSTEM

Joseph E. Lisinski, San Jose, Calif., assignor to International Business Machines Corporation, New York, N.Y., a corporation of New York Filed Aug. 25, 1960, Ser. No. 51,808
3 Claims. (Cl. 198—38)

This invention relates to a document handling system and more particularly to a device for removing documents from a document transport line.

In various types of document handling systems such as in a sorter, it is necessary to selectively remove documents from a transport line and to selectively place them into a plurality of stacker pockets. The prior art shows various means for accomplishing this, such as a simple deflector blade which is raised into the path of the moving document, thereby deflecting the document away from its normal path of travel and into a stacker pocket.

An object of the present invention is to provide an improved device for removing documents from a document transport line.

Another object is to provide a device for removing documents from a document transport line wherein the removal force is applied to a surface area of the documents.

A still further object is to provide a device consistent with the above objects wherein the danger of damaging documents is reduced to a minimum.

Another object is to provide a removal device which is activated by the presence of the document.

A further object is to provide a device for changing the direction of movement of a document.

The invention in general consists for each stacker pocket of a document turning means which may be activated to turn a document and a drive means which grasps each document after it has been turned and then completes the removal of the document from the transport line. The document turning means comprises a rotating disc, the rotating planar surface of which is made to contact the surface of the moving document. The forward motion of the document is thereby dissipated and the document is turned in the plane of its surface. When the document is turned as described above, it is brought into contact with the drive means which pulls it from the transport line and places it in a stacker pocket.

The rotating disc which turns and dissipates the forward motion of the documents engages a surface area rather than an edge of each document. Thusly, the documents are not damaged as they might be if the forward edge of each document were made to engage a fixed stop or a chute blade.

The foregoing and other objects, features, and advantages of the invention will be apparent from the following more particular description of a preferred embodiment of the invention, as illustrated in the accompanying drawings.

Figure 1:
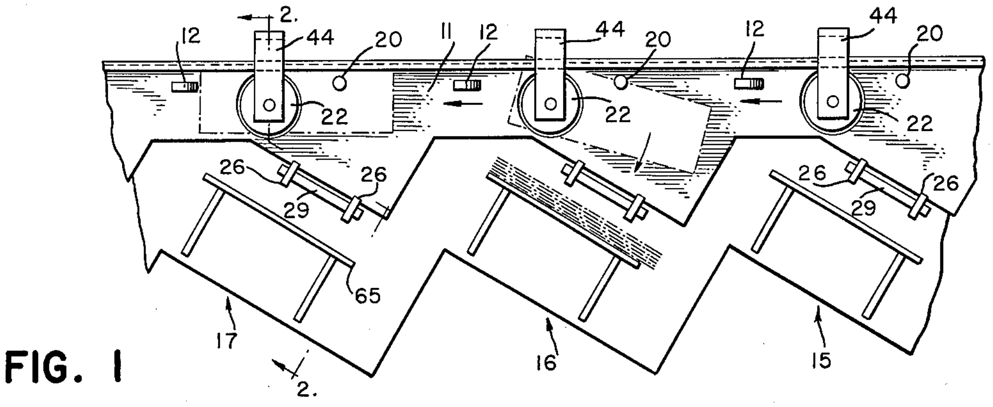
FIG. 1 is a general plan view of the entire transport system.

The general layout of the specific embodiment to be described herein is shown in FIG. 1. The documents are moved along the transport line 11 by the drive wheels 12. A document may be removed from the transport line 11 at any one of the stations 15, 16 or 17. The manner in which a particular station is selected forms no part of the present invention.

Figure 2:
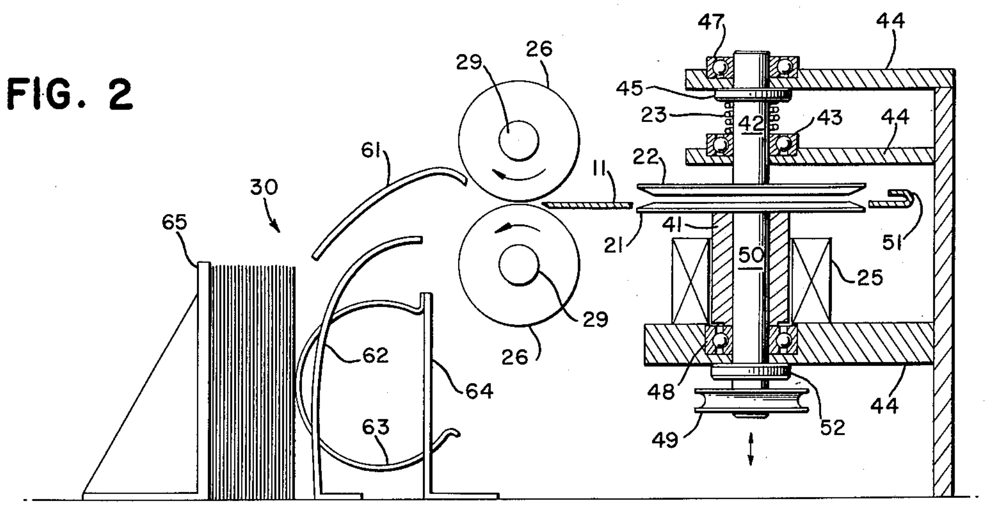
FIG. 2 is a detailed sectional view of one document removal device.

Each of the document removal devices at stations 15,

16 and 17 comprises a constantly rotating disc 21 and a freely rotatable disc 22 (FIG. 2). Disc 22 is adapted to be moved vertically for a short distance. Spring 23 biases disc 22 to the up position, thereby normally establishing a gap between discs 21 and 22 through which documents may be transported.

Figure 3:
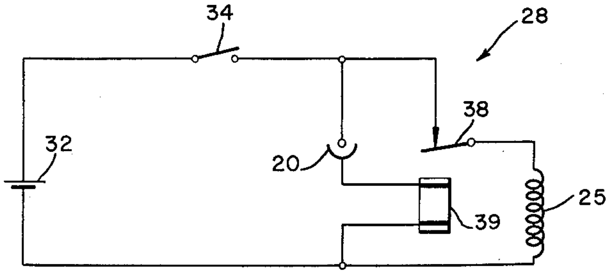
FIG. 3 is a circuit diagram of the actuating circuitry.

The reading and selection circuits of the sorting system (not shown) read each document and activate circuit 28 (FIG. 3) including photocell 20 at the particular station where it is desired to deposit the sensed document, which is the next document to be moved along the transport line. When the document covers the photocell 20, the electromagnet 25 is activated, thereby magnetically pulling the disc 22 down against the document, which, by this time, will be between the discs 21 and 22. The pressure from the disc 22 will force the under surface of the document against constantly rotating disc 21. The joint action of discs 21 and 22 will dissipate the forward motion of the document and the rotational force from disc 21 will swing the rear end of the document away from the transport line 11 and into the drive wheels 26. As the rear end of the document is swung around, away from the transport line 11, the photocell 20 will be uncovered, thereby deactivating the electromagnet 25 and releasing disc 22 so that spring 23 can return disc 22 to the up position. The drive wheels 26 (which are constantly driven by a power means which is not shown) are thus free to pull the document away from the transport line 11 and into the stacker pocket 30.

It should be noted that both the decelerating and the turning force operate on a surface area of the document. Hence, there is no tendency to damage the document, as there might be if the forces were applied to the edges of the document.

The embodiment shown will now be described more specifically. Each of the stations 15, 16 and 17 has associated therewith a circuit 28, such as that shown in FIG. 3 and a removal device as shown in FIG. 2. In general the following description will apply to each station.

After a document is read, selection circuitry (not shown) closes switch 34 at the appropriate station, thereby activating the appropriate circuit 28 including the associated photocell 20. Document readers are well known in the art and for instance the device shown in U.S. Patent 2,872,038, "Records Controlled Machine," by J. B. Andersen could be easily adapted to perform the function of reading the documents and of closing switch 34 at the appropriate station.

Contacts 38 are normally closed; however, if switch 34 is open, coil 25 will not be activated and disc 22 will be in the raised position, thereby allowing documents to pass between the disc 21 and 22. If photocell 20 is not covered by a document, coil 39 will be activated by the power supply 32 when switch 34 is closed. Hence, assuming that there is no document on the transport line, coil 39 will be activated and contacts 38 will be open when switch 34 is closed.

In the normal operation of the device, coil 39 opens contacts 38 almost immediately after switch 34 is closed. Although there is a closed circuit through contacts 38 and coil 25 for an instant after switch 34 closes and before coil 39 can open contacts 38, the time delay introduced into the circuit by coil 25 insures that the disc 22 will be pulled down only after the photocell 20 is covered by a document, thereby deactivating coil 39 and closing normally closed contacts 38.

Disc 22, which is attached to shaft 42, is free to slide and rotate in bearings 43 and 47 which are mounted in the frame 44. Spring 23 creates a force between bearing 43 and the ridge 45 on shaft 42. Hence, the disc 22 is normally biased to the up position; however, it can be pulled down by the activation of coil 25.

Disc 21 is mounted on shaft 50 which is supported by the frame 44 through the bearing 48. On the opposite end of shaft 50 from the disc 21 is the pulley 49 which provides means for constantly rotating the disc 21. Shaft 50 is prevented from moving up by the ridge 52 and it is prevented from moving down by the bushing 41.

Activation of coil 25 (by the presence of a document over the associated photocell if it has been previously activated by the selection circuitry) creates magnetic flux in steel bushing 41. The disc 22 is thereby pulled down and the planar surface of the discs 21 and 22 engage a surface area of the document by pressing the document between discs 21 and 22.

The forward momentum of the document is thereby dissipated and furthermore the document is turned by the action of disc 21. As the document is turned it is brought into engagement with the constantly rotating wheels 26. The wheels 26 grasp the turned document and pull it into the stacker 30. Drive wheels 26 are fixed to shafts 29 and the shafts 29 are rotated by drive pulleys (not shown).

It should be noted that the edges of discs 21 and 22 are beveled to prevent the documents from jamming against the edges and to facilitate the entry of documents between the discs. The documents are guided by document guide 51 as they travel along the transport line. The bottom surface of guide 51 is the surface of the transport line 11, and its rounded edge guides the documents as they move along the transport line. The rounded edge of the guide has a slot at each station through which the corners of a document may extend as it is turned by the rotating discs.

The stacker 30, which receives the documents after they are pulled away from the transport line 11 by the drive wheels 26, has a document guide 61 which guides the documents down into the stacker. The back end of the stack is maintained erect by the movable guide 65, which is spring biased against the back of the stack. The front of the stack is held erect by the spring 63 which fits through a slot in front panel 62 of the stacker. Spring 63 is mounted on the stacker frame 64. As documents enter the front end of the stacker, the guide 65 is pushed back.

The selection system, which is not shown herein, could be of the type which reads certain information from a document and then immediately sets switch 34 at the appropriate station. However, other circuitry could easily be designed whereby several documents could be on the transport line simultaneously. Naturally such a system would necessitate circuitry which could be set by the selection system so that the electromagnets 25 would be activated under joint control of a memory in the selection system and of the photocells 20 so that any particular electromagnet might not be activated the first time that the associated photocell 20 was covered by a document.

While the invention has been particularly shown and described with reference to a preferred embodiment thereof, it will be understood by those skilled in the art that various changes in form and details may be made therein without departing from the spirit and scope of the invention.

I claim:

1. A device for removing a document from a document transport line, said document transport line having a support over which said documents are moved, said device comprising in combination:
   a first rotating disc having the planar surface thereof coplanar with said support;
   a second disc rotatably mounted concentric with and above said first disc;
   means for urging said second disc into engagement with a document moving over the planar surface of said first rotating disc, thereby dissipating the forward momentum of said moving document and forcing the under surface of said document against said first rotating disc, whereby said rotating disc turns said document; and,
   means operable to engage said document as said first rotating disc turns said document to remove said document from said transport line.

2. A device for removing a document from a document transport line, said document transport line having a support over which said documents are moved, said device comprising in combination: a first constantly rotating disc, the planar surface of said disc being coplanar with said support, a second disc, mounting means rotatably mounting said second disc concentric with and above said first disc, said mounting means adapted to allow vertical movement of said second disc, means for biasing said second disc to a position somewhat removed from said first disc, whereby said document may be moved between said discs by said transport line, detecting means for detecting the presence of said document at said device, means responsive to said detection means for urging said second disc toward said first disc whereby said document is pressed between said first and second discs, thereby dissipating the forward momentum of said document and forcing the under surface of said document against said first constantly rotating disc to turn said document, and means for grasping said turned document and for removing it from said transport line.

3. A device for removing a document from a document transport line, said document transport line having a support over which said documents are moved, comprising in combination: a first constantly rotating disc, the planar surface of said disc being coplanar with said support, a second disc including magnetic material, mounting means rotatably mounting said second disc concentric with and above said first disc, said mounting means allowing vertical movement of said second disc, means for biasing said second disc to a position somewhat removed from said first disc, whereby said document can be moved between said discs by said transport line, a magnetic coil concentric with and below said first disc, means for activating said coil when said document is between said discs to move said second disc downwardly whereby said document is pressed between said first and second discs, thereby dissipating the forward momentum of said document and forcing the under surface of said document against said first rotating disc to turn said document, and means for grasping said turned document and for removing it from said transport line.

References Cited in the file of this patent

UNITED STATES PATENTS

| | | |
|---|---|---|
| 1,833,311 | Winkler et al. | Nov. 24, 1931 |
| 2,771,981 | McKune | Nov. 27, 1956 |
| 2,965,374 | Streeter | Dec. 20, 1960 |

FOREIGN PATENTS

| | | |
|---|---|---|
| 530,362 | Germany | July 28, 1931 |